Separation of the alkaloids of the stems and leaves of Tylophora indica

Separation of the alkaloids of Tylophora dalzellii

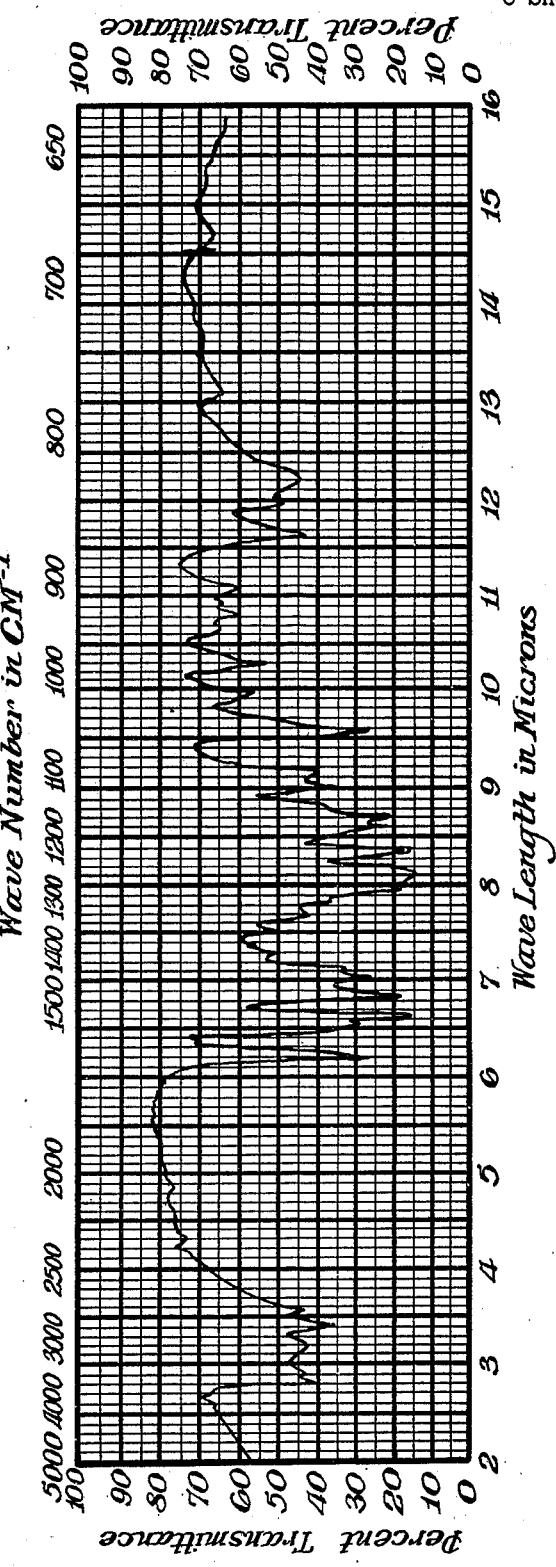

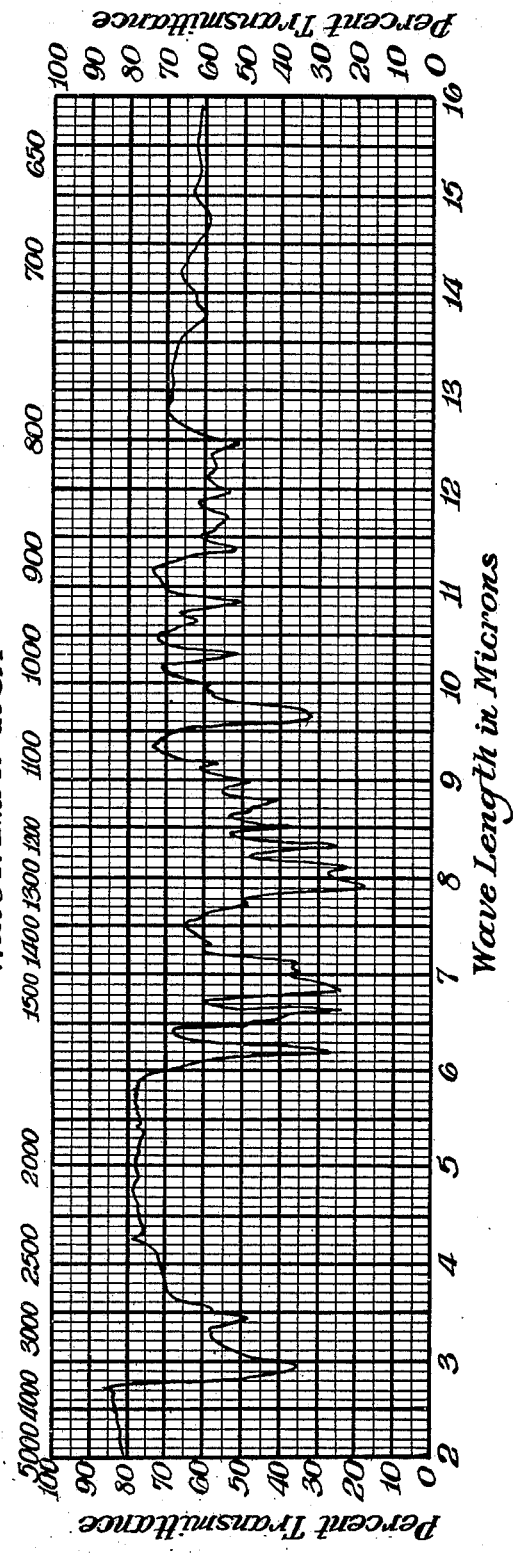

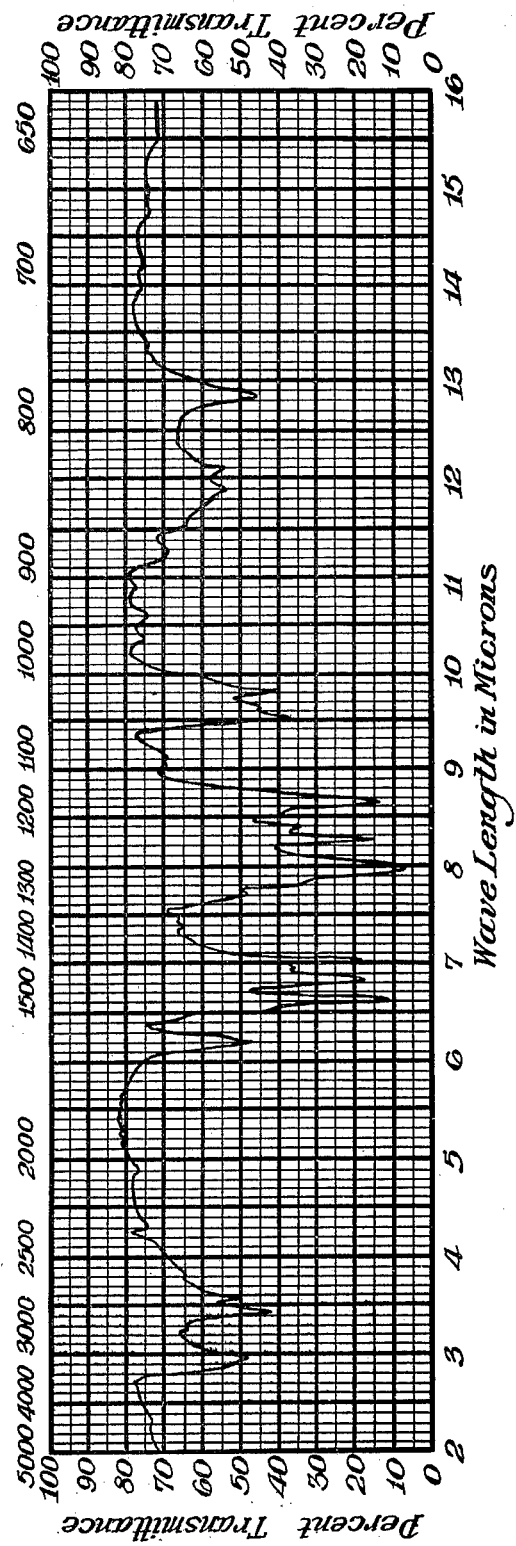

United States Patent Office 3,497,593
Patented Feb. 24, 1970

3,497,593
ALKALOIDS OF TYLOPHORA INDICA
AND TYLOPHORA DALZELLII
Koppaka V. Rao, Pine Brook, N.J., assignor to Chas. Pfizer & Co., Inc., New York, N.Y., a corporation of Delaware
Filed Oct. 12, 1966, Ser. No. 586,216
Int. Cl. A61k 27/14; C07g 5/00
U.S. Cl. 424—195                3 Claims

ABSTRACT OF THE DISCLOSURE

Novel, biologically active alkaloids isolated from *Tylophora indica* and *Tylophora dalzellii*, and their acid addition salts.

This invention relates to several novel, biologically active alkaloids isolated from *Tylophora indica* and *Tylophora dalzellii*, and the acid addition salts thereof.

The genus Tylophora (N.O. Asclepiadaceae) is distributed throughout the Indian Sub-Continent, Indonesia, the Philippines, and northern Australia. Members of this genus are perennial, slender climbing vines and have found medicinal use as vesicants and emetics, as substitutes for Ipecacuanha, and for the treatment of wounds. Early European medical practitioners in India used the leaves and roots of *Tylophora indica* (formerly called *Tylophora asthmatica*) for the treatment of dysentery.

Previous studies of *Tylophora indica* led to the isolation of the alkaloids tylophorine and tylophorinine, Ind. J. Med. Res., 22, 433 (1935); J. Chem. Soc., 2801 (1954). Later chemical and physical studies by T. R. Govindachari et al, of both tylophorine, viz Tetrahedron 4, 311 (1958); Ibid., 9, 53 (1960) and tylophorinine, viz, Chem. & Ind. (London), 950 (1959); Ibid., 966 (1960); Tetrahedron, 14, 288 (1961), revealed that these compounds possess a phenanthroindolizidine skeleton and also led to the assignment of their chemical structures, which were later confirmed by the total synthesis of both compounds, see: Chem. & Ind. (London) 664 (1960); Tetrahedron, 14, 284 (1961); Ibid., 21, 2573 (1965). In addition, E. Gellert, T. R. Govindachari et al., J. Chem. Soc., 1008 (1962), isolated tylocrebrine, from the related species *Tylophora crebriflora*. The structural assignment based on physical and chemical studies, which was confirmed by synthesis of the compound, showed it to be an isomer of tylophorine.

A more detailed and critical examination of the stems, leaves, and roots of *Tylophora indica* has now revealed the presence of several new alkaloids. Besides the previously found tylophorine and tylophorinine, analysis of the extracts from the stems and leaves of *Tylophora indica* reveals the presence of three new alkaloids, one of which is also present in the roots of this plant, along with tylophorine and tylophorinine.

Examination of the plant extracts of *Tylophora dalzellii*, another species of the genus Tylophora, has revealed the presence of two of the novel alkaloids which are present in *Tylophora indica*. The existence of these new alkaloids was not detected nor was their presence suspected by earlier investigators.

The alkaloids of the genus Tylophora have shown antitumor activity, particularly in the leukemia area. The antileukemia activity of tylocrebrine in mice (L-1210) has been previously reported by E. Gellert et al., J. Med. Chem., 7, 361 (1964).

Although the use of the new alkaloids of the present invention in human cancer therapy has not as yet been established, activity against lymphoid leukemia in mice (L-1210) and cytotoxic activity against HeLa cells in tissue cultures is evident.

Figure 1:
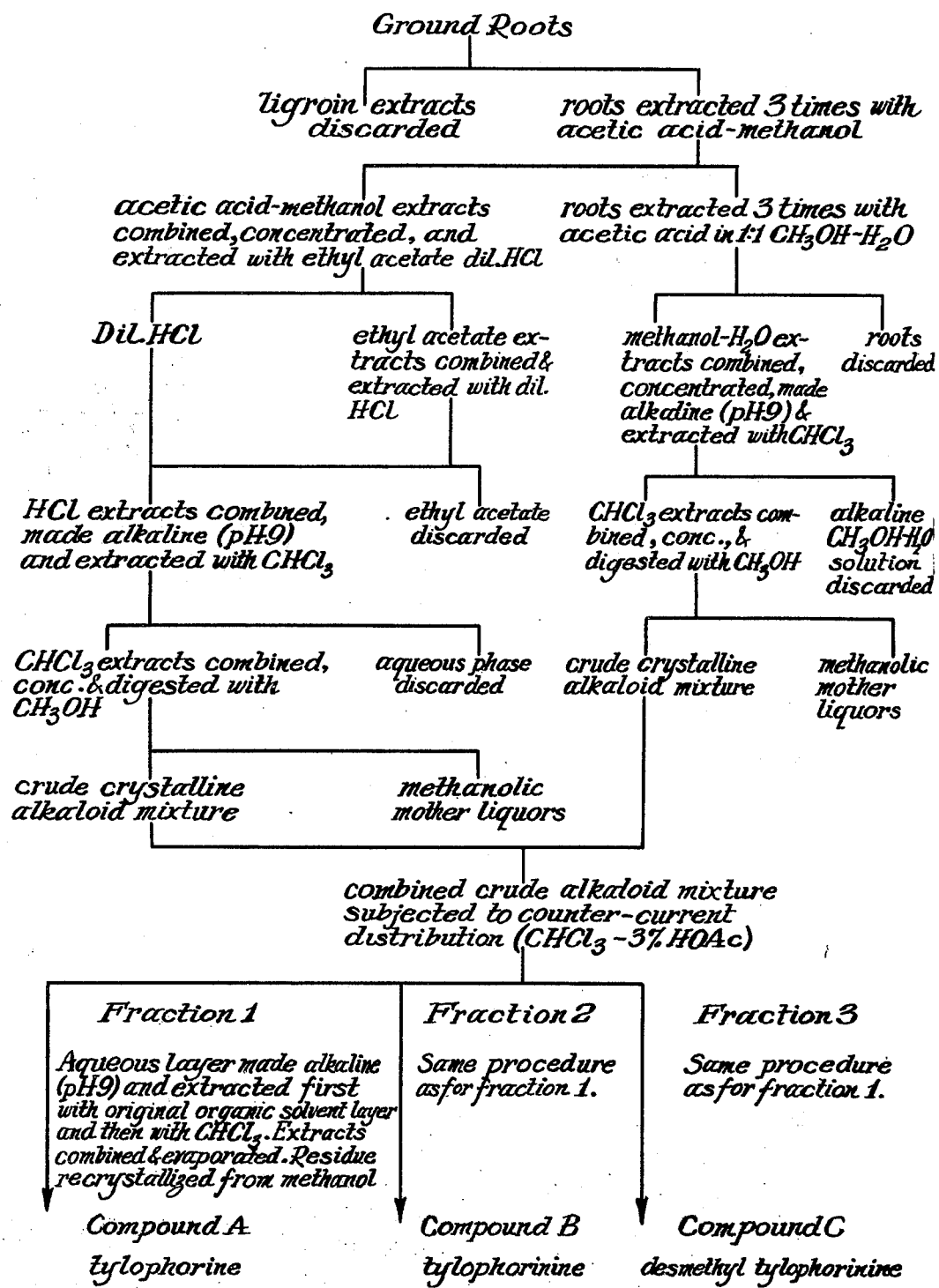
Figure 2:
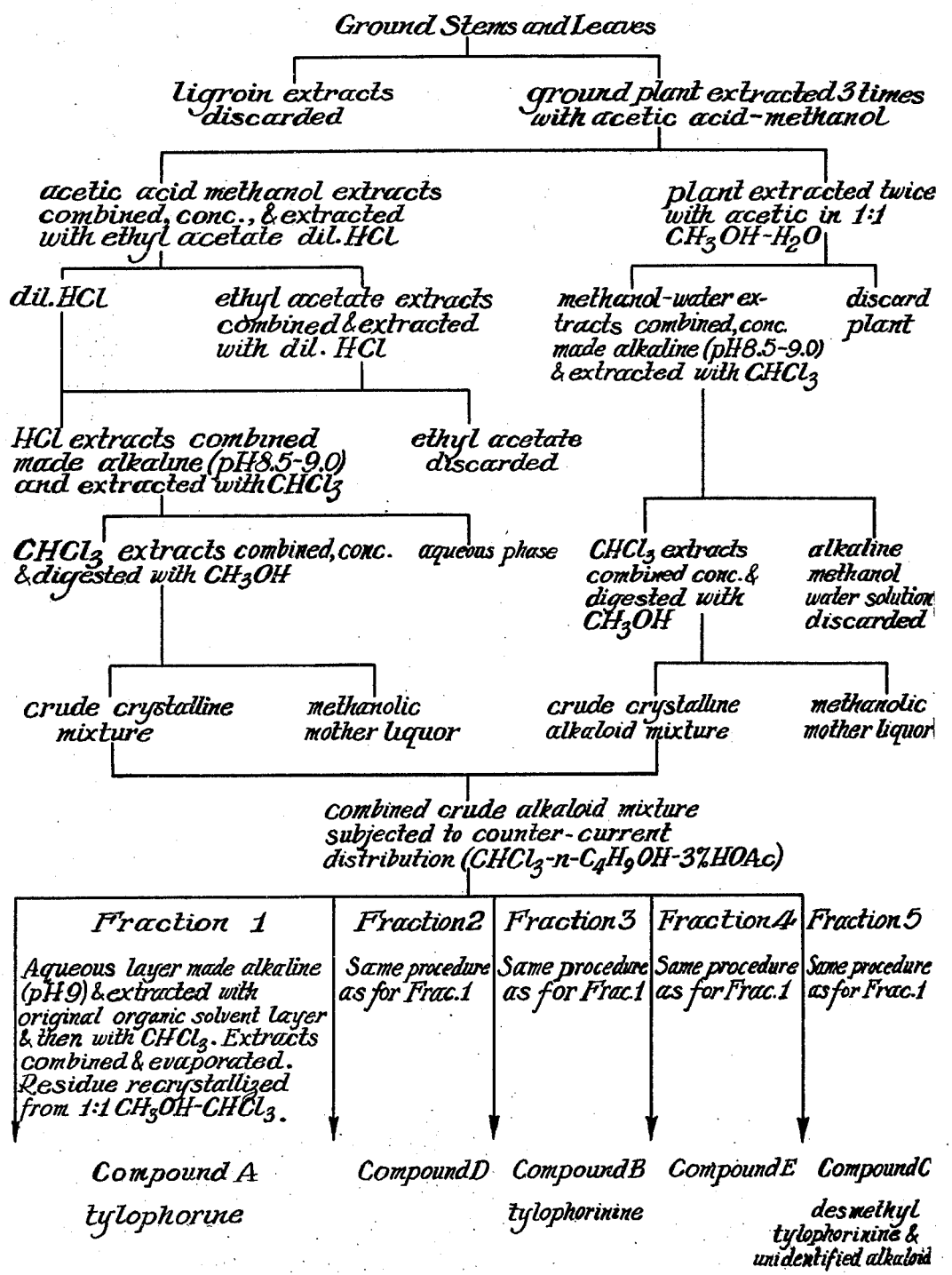
Figure 3:
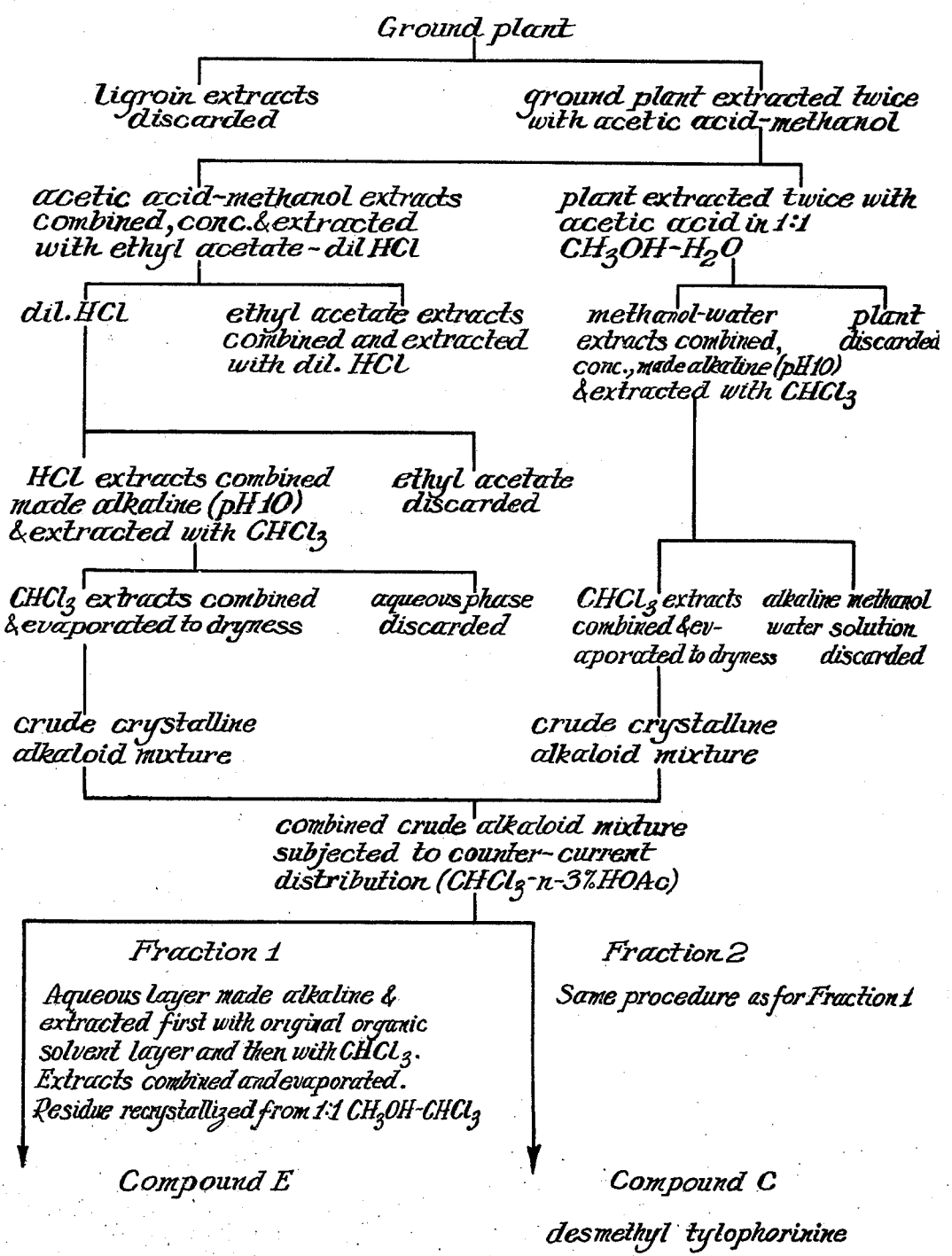

The processes of the present invention for isolating these novel alkaloids are illustrated in FIGURES 1 to 3. They essentially comprise extraction of the milled plant in the cold with ligroin to remove oil-soluble components and chlorophyll. Two such extractions usually suffice. The plant residue is then extracted two or three times in the cold with 1–10% acetic acid in methanol, followed by two or three extractions with 0.5 to 10% acetic acid in 1:1 methanol-water. Other acids, both organic and inorganic, e.g., propionic, butyric, hydrochloric, sulfuric, nitric, etc., can be used in place of acetic acid for these extractions. The major portion of the alkaloids is extracted by the acetic acid-methanol mixture and the remainder by the acetic acid in 1:1 methanol-water mixture. The latter solvent also removes a good deal of the water-soluble pigments. When using sulfuric, hydrochloric, or nitric acids, acid concentrations up to 0.5 N can be used.

The alkaloids are readily extractable from neutral to slightly basic solutions by organic solvents such as ethyl acetate or ether and unextractable from aqueous solutions having a pH of about 2.0 or lower. These properties are utilized to advantage in the isolation procedure of this invention.

The acetic acid-methanol extract is concentrated and the concentrate is shaken between ethyl acetate and dilute (preferable less than 2%) hydrochloric acid. All of the green color and most of the phenolic pigments remain in the organic solvent layer while the bulk of the alkaloids are extracted by the aqueous acid layer. After two or three such extractions with dilute hydrochloric acid all the alkaloids are thus separated. The combined, aqueous acid layers are stirred with chloroform while being gradually made alkaline, preferably with concentrated ammonia, to pH 8–10. Other bases, either inorganic ones such as sodium and potassium hydroxide, carbonate or bicarbonate or organic ones such as the alkylamines, may be used. The chloroform layer is separated and the alkaline, aqueous phase extracted twice more with fresh portions of chloroform. The combined chloroform extracts account for nearly all of the alkaloids.

The combined chloroform extracts are concentrated and the concentrate digested with hot methanol. The resultant mixture is cooled, and the crude, pale-yellow crystalline alkaloid mixture is collected by filtration.

In case of the isolation of the alkaloids of *Tylophora dalzellii*, the digestion with methanol may be omitted (FIGURE 3). The above mentioned acetic acid in methanol-water extract of the plant also contains substantial amounts of alkaloids, although the chief components are water-soluble phenolic pigments, probably of the flavonoid type. This extract is concentrated, made alkaline (pH 8–10) and extracted with chloroform to recover additional alkaloid material. The chloroform extracts are combined and concentrated and the concentrate digested with methanol, as described above, to give additional amounts of crude, crystalline alkaloid mixture. Here again, with the isolation of the alkaloids of *Tylophora dalzellii*, the digestion with methanol may be omitted (FIGURE 3). The above crude alkaloid mixtures thus isolated are combined and the several alkaloids separated as described below.

The alkaloid mixtures of the present invention can be divided into their individual components by subjecting the mixture to a countercurrent distribution process. In the case of the alkaloid mixtures isolated from the stems and leaves of *Tylophora indica* and *Tylophora dalzellii* the separation is successfully performed by using a chloroform-n-butanol-3% acetic acid (4:1:5, respectively) solvent system, while with the alkaloid mixture of the roots of *Tylophora indica* a 3% acetic acid-chloroform (1:1) solvent system is effective.

The course of the separation is followed by observing and plotting the optical density at 260–262 m$\mu$ versus the corresponding tube number. In the case of the alkaloids isolated from the roots of *Tylophora indica*, three peaks (FIGURE 1) are observed in this graphical representation. The fractions from the tubes corresponding to the first peak afford tylophorine, (compound A); the fractions from the tubes corresponding to the second peak yield tylophorinine (compound B); and the fractions from the tubes corresponding to the third peak yield compound C, a new alkaloid. Because treatment of the new alkaloid with diazomethane yields tylophorinine, it is herein designated as desmethyl tylophorinine.

The graphical representation of the countercurrent distribution separation of the alkaloid mixture isolated from the leaves and stems of *Tylophora indica* exhibits five peaks (FIGURE 2). The fractions corresponding to the first peak afford tylophorine; the fractions corresponding to the second peak afford a completely new alkaloid herein referred to as compound D; the fractions corresponding to the third peak yield tylophorinine; the fractions corresponding to the fourth peak provide another new alkaloid, which is designated as compound E; and the fractions of the fifth and last peak contain mainly desmethyl tylophorinine and a very small amount of an unidentified alkaloid.

The graphical representation of the countercurrent distribution separation of the alkaloid mixture of *Tylophora dalzellii* exhibits two peaks (FIGURE 3). Compound E, which is also isolated from the stems and leaves of *Tylophora indica*, as described hereinabove, is isolated from the fractions corresponding to the first peak and compound C, desmethyl tylophorinine, which was isolated from the stems and leaves as well as from the roots of *Tylophora indica*, is isolated from the fractions corresponding to the second peak.

The following paper chromatographic procedure is used for the determination of the $R_f$ values of these alkaloids. Whatman No. 1 or No. 4 sheets, 6 inches by 18 inches in size, are dipped into a solution of 30% formamide in methanol and blotted. The samples are applied in the usual manner and the papers are developed with chloroform which has been saturated with formamide. The spots on the paper can be readily detected either by fluorescence in or absorption of ultraviolet light. When exposed to ultraviolet light the spots rapidly turn yellow. The spots can also be detected with several sprays, e.g., ceric sulfate, nitrous acid, Dragendorf reagent.

In this formamide-chloroform system the following $R_f$ values are observed:

Compound B (tylophorinine) _____ 0.3–0.4
Compound C (desmethyl tylophorinine) ____ 0.1–0.2
Compound D _____ 0.23–0.45
Compound E _____ 0.45–0.65

The anti-tumor activity of compound C, desmethyl tylophorinine, against mouse leukemia L–1210 is tabulated in Table I.

TABLE I

Activity of Desmethyl Tylophorinine isolated from *Tylophora indica* and *Tylophora dalzellii* against Mouse Leukemia (L–1210) [1]

| Dose (mg./kg.) | Survival rate | Increase in survival time, percent [2] |
|---|---|---|
| 5 | 6/6 | 125 |
| 5 | 6/6 | 130 |
| 6 | 6/6 | 140 |
| 6 | 6/6 | 124 |
| 8 | 6/6 | 131 |
| 9 | 6/6 | 128 |
| 10 | 6/6 | 132 |
| 10 | 6/6 | 145 |
| 12 | 6/6 | 151 |
| 12 | 6/6 | 136 |
| 15 | 6/6 | 131 |
| 15 | 6/6 | 145 |

[1] For method of tumor evaluation see: L.W. Law, et al., J. Nat. Cancer Inst., 10, 179 (1949).
[2] Increase in survival time of test animals (those treated with desmethyl tylophorinine) relative to that of control animals (untreated animals).

The cytotoxic activity of compounds C, D, and E against HeLa cells in tissue cultures is given in Table II.

TABLE II

Cytotoxic activity of the alkaloids from *Tylophora indica* and *Tylophora dalzellii* against HeLa cells

| Compound | Cytotoxic endpoint, γ/cc. Toplin Method [3] | Eagle-Foley [4] Method, $ID_{50}$ | Lethal endpoint [5] (Toplin method) |
|---|---|---|---|
| C | 0.015 | 0.0007–0.002 | 0.15 |
| D | 0.3 |  | 1.0 |
| E | 0.3 |  | 1.0 |

[3] For complete details of test see: I. Toplin, Cancer Research, 19, 959 (1959).
[4] For complete details of test see: H. Eagle and G. E. Foley, Cancer Research, 18, 1017 (1958); $ID_{50}$ is concentration which causes 50% inhibition of growth.
[5] Concentration which produces complete cell destruction.

The following examples are provided in order to describe more fully the present invention; however, they are not to be considered as limiting the scope thereof.

EXAMPLE I

Separation of alkaloids from the roots of *Tylophora indica*

The ground roots of *Tylophora indica* (ten kg.) are extracted in the cold with two (5–8)-liter portions of ligroin to remove oil-soluble components. The roots are next extracted with three 10-liter portions of 1% acetic acid in methanol, each extraction lasting a whole day, and then with three 10-liter portions of 1% acetic acid in 1:1 water-methanol.

The acetic acid-methanol extracts are combined and concentrated to a volume of 0.5 liter. The concentrate is distributed between two liters of ethyl acetate and two liter of 0.5 N hydrochloric acid. After separation of the two layers, the ethyl acetate layer is extracted with two 500 ml. portions of 0.5 N hydrochloric acid. The acid extracts are combined, the pH adjusted to 9–10 with ammonia or other suitable base, and the alkaline solution extracted with three 2-liter portions of chloroform. The extracts are combined, concentrated to a small volume and digested with hot methanol. The mixture is cooled and filtered. The filtered solid is washed with cold methanol and provides 6–7 g. of a pale-yellow, crystalline alkaloid mixture. The mother liquor is set aside for later processing.

The 1:1 methanol-water extracts are combined and concentrated to a volume of 0.5 liter, and likewise made alkaline (pH 9–10) with ammonia. The alkaline mixture is extracted with three 1-liter portions of chloroform. The chloroform extracts are combined, concentrated, and digested with hot methanol in the manner described above to provide an additional gram of pale-yellow, crystalline alkaloid mixture. The mother liquors are combined with those from the preceding methanol digestion and the total set aside for counter-current distribution.

The above pale-yellow, crystalline alkaloid mixtures are combined and ca. 2 g. are placed in the first 2 tubes of a 30 tube counter-current distribution apparatus and the distribution carried out to 30 transfers with a 3% acetic acid-chloroform solvent system (1:1). Three peaks are clearly distinguishable when the optical density (ordinate) at 260–262 m$\mu$ is plotted against the tube number (abscissa). The first peak corresponds to tubes 0–8, the second peak to tubes 12–18, and the third to tubes 23–30. The two-layer fractions corresponding to the first peak (tubes 0–8) are combined and the pH adjusted to 8–9 with ammonia or other suitable base. The aqueous, alkaline layer is first extracted with the original, lower chloroform layer and then with a fresh portion of chloroform. The chloroform extracts are combined and evaporated to dryness to provide a solid residue which is recrystallized from methanol to yield A, a colorless, crystalline solid with M.P. 280–285° C. (dec.). The physical constants, infrared and ultraviolet absorption spectra, and chromatographic behavior are identical with those of an authentic sample of tylophorine.

The fractions corresponding to the second peak (tubes 12–18) are also combined and treated in the same manner as those corresponding to the first peak above. Recrystallization of the solid residue, obtained after evaporation of the chloroform, from methanol gives compound B, a colorless, crystalline solid with M.P. 243–245° C. (dec.). The physical constants, infrared and ultraviolet absorption spectra, and the chromatographic behavior are identical with those of an authentic sample of tylophorinine.

Similar processing of the fractions corresponding to the third peak (tubes 23–30) provides a solid residue which recrystallizes from methanol as a colorless, crystalline solid, compound C, M.P. 218–220° C. (dec.), which is shown by paper chromatography to be a pure susbtance.

*Analysis.*—Calcd. $C_{22}H_{23}NO_4$: C, 72.31; H, 6.34; N, 3.83; $OCH_3$, 17.0 (2). Found: C, 72.28; H, 6.31; N, 3.39; $OCH_3$, 15.60%.

The ultraviolet spectrum of the compound in methanol exhimits maxima at 257 and 285 mµ with $E_{1\ cm.}^{1\%}$ of 1390 and 750, respectively. The infrared spectrum (FIGURE 4) measured in a potassium bromide pellet at a 1% concentration reveals prominent absorption bands at 2.82, 2.91, 3.40, 6.18, 6.60, 6.80, 7.02, 7.90, 8.09, 8.56, 9.00, 9.60, 9.91, 10.25, 11.65, 12.20, and 13.30 µ.

When chromatographed on formamide-impregnated Whatman No. 1 or No. 4 paper this compound exhibits an $R_f$ value of 0.1–0.20 in a chloroform-saturated-with-formamide solvent system. Acetylation of compound C with acetic anhydride in pyridine yields a diacetate, M.P. 178–180° C.

*Analysis.*—Calcd. $C_{26}H_{27}NO_6$: C, 69.47; H, 6.05; N, 3.12. Found: C, 68.71; H, 6.08; N, 2.89%.

The infrared spectrum (potassium bromide) reveals 2 strong carbonyl bands at 5.67 and 5.79 µ.

A solution of compound C in chloroform reacts with a slight excess of diazomethane in ether to yield tylophorinine. Therefore, compound C is herein called desmethyl tylophorinine. It thus contains an available phenolic hydroxyl group.

The combined mother liquors obtained in the initial processing treatment of the plant (see above) can be evaporated to dryness and the solid residue subjected to counter-current distribution as previously described hereinabove.

EXAMPLE II

Separation of alkaloids from the stems and leaves of *Tylophora indica*

The stems and leaves of the dried, ground, whole plant (10 kg.) are extracted in the cold with two (5–8)-liter portions of ligroin. The ligroin extraction removes most of the chlorophyll and other green pigments and oily components, but essentially none of the alkaloids. The plant material is then extracted in the cold with three (5–8)-liter portions of 1% acetic acid in methanol, each extraction lasting a full day. The plant is then extracted with two 10-liter portions of 1% acetic acid in 1:1 methanol-water to remove the final traces of alkaloids and water-soluble yellow pigments.

The acetic acid-methanol extract, which contains nearly all of the alkaloid fraction, is concentrated to a volume of 0.5 liter and distributed between two liters of ethyl acetate and two liters of 0.5 N hydrochloric acid. The two immiscible layers are separated. Extraction of the ethyl acetate layer with three 1-liter portions of 0.5 N hydrochloric acid removes residual traces of the basic alkaloid fraction and the water-soluble, yellow flavonoid pigments. The acid solutions are combined and the pH adjusted to 8.5–9.0 with ammonia or other suitable base and extracted with three 2-liter portions of chloroform. The alkaloids pass into the chloroform layer while the yellow flavonoid pigments remain in the aqueous layer. The chloroform extracts are combined, concentrated to a small volume and digested with hot methanol. The mixture is cooled and filtered. The filtered solid is washed with cold methanol to yield 10 g. of a pale-yellow, crystalline alkaloid mixture. The mother liquors are set aside.

The 1:1 methanol-water extracts described above are also concentrated to a volume of about 0.5 liter and the pH adjusted to about 8.5–9.0 with ammonia. The alkaline mixture is then extracted with three 1-liter portions of chloroform, which are combined and concentrated to a small volume. The concentrate is digested with hot methanol as previously described, to afford an additional two g. of pale-yellow, crystalline alkaloid mixture. The mother liquor is combined with those from the preceding methanol digestion and the total set aside for counter-current distribution.

The above combined, pale-yellow crystalline alkaloid mixture (12 g.) is placed in the first five tubes of a 100 tube counter-current distribution apparatus and the distribution carried out to 100 transfers with a chloroform-n-butanol-3% aqueous acetic acid solvent system (4:1:5, respectively). Five peaks are distinguishable when the optical density (ordinate) at 260–262 mµ. is plotted against the tube number (abscissa). The first peak corresponds to tubes 0–8; the second to tubes 12–30; the third to tubes 33–58; the fourth to tubes 59–79; and the fifth to tubes 80–99.

The two-layer fractions corresponding to the first peak (tubes 0–8) are combined and the pH of the aqueous layer adjusted to 8–9 with ammonia or other suitable base. The aqueous layer is first extracted with the lower, original organic layer and then once with fresh chloroform. The extracts are combined and evaporated to dryness to yield compound A, tylophorine, a colorless crystalline solid which is recrystallized from chloroform-methanol (1:1) to afford a colorless crystalline solid melting at 280–285° C. (dec.). The ultraviolet and infrared absorption spectra and chromatographic behavior are identical with those of authentic tylophorine. The fractions of the second peak (tubes 12–30) are likewise combined and treated exactly as described for those of the first peak. The product, compound D, is recrystallized from chloroform-methanol (1:1) to yield a colorless, crystalline solid, M.P. 250–252° C. (dec.), which is shown by paper chromatography to be a pure substance.

*Analysis.*—Calcd. for $C_{23}H_{25}NO_6$: C, 67.14; H, 6.12; N, 3.40; $OCH_3$ (2), 15.1. Found: C, 66.89; H, 6.45; N, 3.45; $OCH_3$, 15.28%.

The ultraviolet spectrum of the compound in methanol exhibits maxima at 240, 258, 285, and 314 mµ. with $E_{1\ cm.}^{1\%}$ of 840, 1310, 720, and 228 respectively. The infrared spectrum (FIGURE 5) measured in a potassium bromide pellet 1% concentration has prominent bands at 2.92, 3.41, 6.20, 6.60, 6.84, 7.01, 7.10, 7.90, 8.10, 8.30, 8.50, 8.78, 8.98, 10.30, 10.60, 10.82, 11.35, 11.73, 11.95, 12.45, and 13.75 µ. When chromatographed on formamide-impregnated Whatman No. 1 or No. 4 paper, this compound exhibits an $R_f$ value of 0.25–0.45 in a chloroform-saturated-with-formamide solvent system.

Collection of the fractions in tubes 33–58, which correspond to the third peak, and subsequent treatment as above, provides compound B. Its physical constants, infrared and ultraviolet absorption spectra, and chromatographic behavior are identical with those of authentic tylophorinine.

The contents of tubes 59–79 (fourth peak) are similarly combined and treated as previously described. The product, compound E, is recrystallized from chloroform-methanol (1:1) to give a colorless, crystalline solid, M.P. 233–235° C. (dec.). Paper chromatographic analysis shows this material to be pure.

*Analysis.*—Calcd. for $C_{23}H_{25}NO_4 \cdot \frac{1}{2}H_2O$: C, 71.65; H, 6.75; N, 3.61; $OCH_3$ (3), 23.90, Found: C, 71.51; H, 6.58; N, 3.63; $OCH_3$, 23.03%.

The ultraviolet spectrum of the compound in methanol exhibits maxima at 257 and 280 mµ with $E_{1\ cm.}^{1\%}$ of 2,000 and 1,000 respectively. The infrared spectrum (FIGURE 5) measured in a potassium bromide pellet at a 1% concentration shows prominent bands at 2.91, 6.20, 6.60, 6.82, 7.03, 8.00, 8.28, 8.69, 9.53, 9.67, 9.80, 11.90, 12.10, and 12.88 μ. When chromatographed on formamide-impregnated Whatman No. 1 or No. 4 paper, compound E exhibits an $R_f$ value of 0.45–0.65 in a chloroform-saturated-with-formamide solvent system. The fractions of tubes 80–99, which correspond to the last major peak, are processed in the same manner as for the preceding fractions. Compound C, desmethyl tylophorinine, is isolated from this last series of tubes. This material is clearly established as desmethyl tylophorinine by a comparison of its physical constants, ultraviolet and infrared absorption spectra, and chromatographic behavior with those of the desmethyl tylophorinine isolated from the roots of *Tylophora indica* described hereinbefore.

The last series of tubes also contain a small amount of an unidentified alkaloid.

The combined mother liquors obtained in the initial processing of the plant (see above) can be evaporated to dryness and the residue also subjected to counter-current distribution as previously described hereinabove.

EXAMPLE III

Separation of the alkaloids from *Tylophora dalzellii*

The ground, whole plant (5 kg.) is extracted in the cold with two 3-liter portions of ligroin to remove the oil-soluble components, chlorophyll and other green pigments. The alkaloids are removed from the plant by extraction with two 5-liter portions of 1% acetic acid in methanol, each extraction lasting a full day. The plant is finally extracted with two 5-liter portions of 1% acetic acid in 1:1 methanol-water to remove the last traces of the alkaloid fraction.

The acetic acid-methanol extracts, which contain the major portion of the alkaloid fractions, are combined and concentrated to a volume of about 500 ml. and distributed between 1 liter of 0.5 N hydrochloric acid and 1 liter of ethyl acetate. The acid layer is separated and the ethyl acetate layer extracted once with a 500 ml. portion of 0.5 N hydrochloric acid. The acid extracts are combined, and the pH adjusted to 10 with ammonia. The alkaloid mixture is extracted with three 1-liter portions of chloroform. Combination and evaporation of the chloroform extracts affords 2 g. of a pale-yellow crystalline alkaloid mixture. The methanol-water extract is combined, concentrated, and made alkaline (pH 10). Extraction with chloroform and evaporation thereof provides an additional 0.5 g. of pale-yellow crystalline alkaloid mixture.

The combined, solid alkaloid mixture (2.5 g.) is placed in the first 2 tubes of a 30-tube countercurrent distribution apparatus and the distribution carried out to 30 transfers with a chloroform-n-butanol-3%-aqueous acetic acid (4:1:5, respectively) solvent system. Two peaks are clearly distinguishable when the optical density (ordinate) is graphed against the tube number (abscissa). The first peak corresponds to tubes 6–12, and the second peak to tubes 22–30.

The two-layer fractions corresponding to the first peak (tubes 6–12) are combined and the pH adjusted to 9 with ammonia. The alkaline, aqueous phase is extracted first with the lower, original organic layer and then once with chloroform. The extracts are combined and evaporated to dryness to yield a solid which crystallizes from 1:1 methanol-chloroform as a colorless, crystalline solid and represents about 10% of the total alkaloid fraction. The physical constants, ultraviolet and infrared absorption spectra, and chromatographic behavior are identical with those of compound E, which was isolated from the stem and leaves of *Tylophora indica*. The fractions from the tubes corresponding to the second peak are treated in an identical fashion and yield a solid which crystallizes from 1:1 methanol-chloroform as colorless crystals. It is readily identified as desmethyl tylophorinine by comparison of its physical properties, ultraviolet and infrared absorption spectra, and chromatographic behavior with those of an authentic sample of desmethyl tylophorinine isolated from *Tylophora indica* as described hereinabove.

EXAMPLE IV

A solution of 100 mg. of compound C, desmethyl tylophorinine, in 25 ml. of chloroform is treated with a slight excess of diazomethane in ether. The solution is allowed to stand overnight at room temperature. The solvents are evaporated and the solid residue is recrystallized from chloroform-methanol (1:4) to afford colorless crystals whose physical constants, infrared absorption spectrum, and paper chromatographic behavior are identical with those of an authentic sample of tylophorinine.

EXAMPLE V

A solution of 100 mg. of compound C, desmethyl tylophorinine, in 3 ml. of acetic anhydride and 0.5 ml. of pyridine is heated at 100° C. for two hours. The mixture is cooled and diluted with water. After the solution has been allowed to stand for 30 minutes, it is made slightly basic and extracted with chloroform. The extracts are combined, concentrated to dryness, and the solid residue recrystallized from chloroform:petroleum ether (1:4), to give colorless crystals, M.P. 178–180° C.

*Analysis.*—Calcd. for $C_{26}H_{27}NO_6$: C, 69.47; H, 6.05; N, 3.12. Found: C, 68.71; H, 6.08; N, 2.89%.

EXAMPLE VI

Acid Addition Salts of the Alkaloids

The acid addition salts of the new alkaloids can be prepared by adding the desired acid in methanol to a chloroform solution of the alkaloid. A stoichiometric amount, or slight excess, of acid is used. The acid salts separate from solution, are filtered, and recrystallized from chloroform-methanol. In this manner the hydrochloride, sulfate, nitrate, oxalate, acetate, propionate, butyrate, tartrate and citrate salts of the alkaloid compound can be prepared.

EXAMPLE VII

The quaternary methonium iodide salts of the alkaloid compounds can be prepared by treating a solution of the appropriate alkaloid in chloroform with a slight excess of methyl iodide in methanol. The resultant salts are filtered and recrystallized from chloroform-methanol.

The products of Examples VI and VII serve as useful dosage forms of these alkaloids.

What is claimed is:

1. An alkaloid substance selected from the group consisting of desmethyl tylophorinine, a crystalline substance, which substance is insoluble in water, soluble in chloroform and aqueous acid solutions, which crystallizes from methanol as colorless crystals, M.P. 218–220° C. (dec.); which substance exhibits absorption maxima in the ultraviolet region of the spectrum when dissolved in methanol at 257 mμ. and 285 mμ. with $E_{1\,cm.}^{1\%}$ values of 1390 and 750, respectively; and, when measured in a potassium bromide pellet containing 1% of the product, exhibits absorption maxima in the infrared region of the spectrum at 2.82, 2.91, 3.40, 6.18, 6.60, 6.80, 7.02, 7.90, 8.09, 8.56, 9.00, 9.60, 9.91, 10.25, 11.65, 12.20, and 13.30 μ; and which compound contains the elements carbon, hydrogen, nitrogen, and oxygen, and in addition, the methoxyl group, in the following percentages by weight:

| | |
|---|---|
| Carbon | 72.28 |
| Hydrogen | 6.31 |
| Nitrogen | 3.39 |
| Oxygen (by difference) | 18.02 |
| Methoxyl | 15.60 | which substance exhibits an $R_f$ value of 0.1–0.20 when chromatographed on formamide-impregnated Whatman No. 1 or No. 4 paper in a chloroform-saturated-with-formamide solvent system; which substance forms a colorless, crystalline diacetyl derivative having a melting point of 178–180° C., said diacetyl compound containing the elements carbon, hydrogen, nitrogen, and oxygen in the following percentages by weight:

| | |
|---|---|
| Carbon | 68.71 |
| Hydrogen | 6.08 |
| Nitrogen | 2.89 |
| Oxygen (by difference) | 22.32 | and which diacetyl derivative when measured in a potassium bromide pellet exhibits absorption maxima in the infrared region of the spectrum at 5.67 and 5.79 $\mu$, which substance when dissolved in chloroform and treated with a solution of diazomethane in ether yields the known compound tylophorinine; and, the acid addition salts thereof.

2. An alkaloid substance selected from the group consisting of compound D, a crystalline substance, which substance is insoluble in water, soluble in chloroform and in aqueous acid solutions, which recrystallizes from chloroform-methanol (1:1) as a colorless, crystalline solid and has a melting point of 250–252° C. (dec.); which substance exhibits absorption maxima in the ultraviolet region of the spectrum when dissolved in methanol at 240, 258, 285, and 314 m$\mu$, with $E_{1\ cm.}^{1\%}$ values of 840, 1310, 720, and 228, respectively; and, when measured in a potassium bromide pellet containing 1% of the product, exhibits absorption maxima in the infrared region of the spectrum at 2.92, 3.41, 6.20, 6.60, 6.84, 7.01, 7.10, 7.90, 8.10, 8.30, 8.50, 8.78, 8.98, 10.30, 10.60, 10.82, 11.35, 11.73, 11.95, 12.45, and 13.75 $\mu$; and which contains the elements carbon, hydrogen, nitrogen, and oxygen, and in addition, the methoxyl group, in the following percentages by weight:

| | |
|---|---|
| Carbon | 66.89 |
| Hydrogen | 6.45 |
| Nitrogen | 3.45 |
| Oxygen (by difference) | 23.21 |
| Methoxyl | 15.28 | which substance exhibits an $R_f$ value of 0.25–0.45 when chromatographed on formamide-impregnated Whatman No. 1 or No. 4 paper with a chloroform-saturated-with formamide solvent system; and, the acid addition salts thereof.

3. An alkaloid substance selected from the group consisting of compound E, a crystalline substance, which substance is insoluble in water, soluble in chloroform and in aqueous acid solutions, which crystallizes from chloroform-methanol (1:1) as a colorless, crystalline solid and has a melting point of 233–235° C. (dec.); which substance exhibits absorption maxima in the ultraviolet region of the spectrum when dissolved in methanol at 257 and 280 m$\mu$ with $E_{1\ cm.}^{1\%}$ values of 2,000 and 1,000, respectively; and, when measured in a potassium bromide pellet containing 1% of the product exhibits absorption maxima in the infrared region of the spectrum at 2.91, 6.20, 6.60, 6.82, 7.03, 8.00, 8.28, 8.69, 9.53, 9.67, 9.80, 11.90, 12.10, and 12.88 m$\mu$; and which contains the elements carbon hydrogen, nitrogen and oxygen, and in addition, the methoxyl group, in the following percentages by weight:

| | |
|---|---|
| Carbon | 71.51 |
| Hydrogen | 6.58 |
| Nitrogen | 3.63 |
| Oxygen (by difference) | 18.28 |
| Methoxyl | 23.03 | which substance exhibits an $R_f$ value of 0.45–0.65 when chromatographed on formamide-impregnated Whatman number 1 or number 4 paper with a chloroform-saturated-with-formamide solvent system; and, the acid addition salts thereof.

References Cited
UNITED STATES PATENTS

| | | | |
|---|---|---|---|
| 2,866,784 | 12/1958 | Gillo et al. | 260—236 |
| 3,256,149 | 6/1966 | Beckett et al. | 424—195 |

OTHER REFERENCES

Govindachari et al.: Chemical Society Journal, 1954, pp. 2801–2803.

ALBERT T. MEYERS, Primary Examiner

D. M. STEPHENS, Assistant Examiner